United States Patent
Bere et al.

(10) Patent No.: US 6,318,900 B1
(45) Date of Patent: Nov. 20, 2001

(54) BALL BEARING MOUNTING MEMBER

(75) Inventors: John Delbert Bere; Stefan Zenon Smorowski, both of London (CA)

(73) Assignee: Siemens Automotive Inc., Mississauga (CA)

(*) Notice: Subject to any disclaimer, the term of this patent is extended or adjusted under 35 U.S.C. 154(b) by 0 days.

(21) Appl. No.: 09/520,199

(22) Filed: Mar. 7, 2000

Related U.S. Application Data

(60) Provisional application No. 60/175,533, filed on Jan. 11, 2000.

(51) Int. Cl.[7] .......................... F16C 35/077; F16C 43/00
(52) U.S. Cl. .......................... 384/535; 384/537; 384/903
(58) Field of Search ......................... 384/537, 539, 384/585, 903, 535, 581; 310/90; 403/372; 29/898, 898.07; 411/974

(56) References Cited

U.S. PATENT DOCUMENTS

| | | | |
|---|---|---|---|
| 1,639,684 | * 8/1927 | Bott | 384/535 |
| 2,504,776 | * 4/1950 | Woodfield et al. | 384/537 |
| 2,506,404 | * 5/1950 | Woodfield et al. | 384/537 |
| 4,364,615 | 12/1982 | Euler . | |
| 4,385,846 | 5/1983 | Knauss . | |
| 4,710,037 | * 12/1987 | Newberg | 384/537 |
| 4,924,127 | 5/1990 | Boireau et al. . | |
| 5,059,042 | 10/1991 | Grierson . | |
| 5,060,750 | 10/1991 | Klages . | |
| 5,139,350 | 8/1992 | Gieseler et al. . | |
| 5,284,390 | 2/1994 | Hanaway . | |
| 5,505,548 | * 4/1996 | Stewart | 384/537 |
| 5,511,885 | 4/1996 | Coleman . | |
| 5,977,672 | 11/1999 | Vacca . | |

FOREIGN PATENT DOCUMENTS

| | | | |
|---|---|---|---|
| 894743-A | * 4/1962 | (GB) | 384/903 |
| 1-1443481-A | * 6/1989 | (JP) . | |
| 6-335891-A | * 12/1994 | (JP) . | |

\* cited by examiner

Primary Examiner—David A. Bucci
Assistant Examiner—William C Joyce

(57) ABSTRACT

A one-piece ball bearing mounting member 16 is provided for mounting a ball bearing in a housing. The mounting member includes a ring member 18. Tolerance take-up structure 22 extends from the ring member 18 in one direction and is constructed and arranged to engage at least a portion of a periphery of a ball bearing. At least a portion of the tolerance take-up structure 22 is resilient so that when inserted into the housing the resilient portion contacts a wall of the housing to take-up tolerances between the periphery of the ball bearing and the wall of the housing. A retaining structure 34 extends from the ring member 18 in a direction opposite the one direction. The retaining structure 34 is constructed and arranged 1) to permit insertion of the ball bearing mounting member into the housing in an insertion direction, and 2) to prevent movement of the ball bearing mounting member from the housing in a direction opposite the insertion direction.

16 Claims, 2 Drawing Sheets

BALL BEARING MOUNTING MEMBER

This application is based on and claims the benefit of U.S. Provisional Application Ser. No. 60/175,533, filed Jan. 11, 2000.

BACKGROUND OF THE INVENTION

The present invention relates to ball bearing mounting structure and more particularly to mounting a ball bearing in a stamped housing so as to be retained therein.

Conventionally, ball bearings for motors are mounted in a stamped housing which is not machined to have tight tolerances with ball bearing. With reference to FIG. 1, the ball bearing 10 is mounted using two separate components, a tolerance ring 12 and a retaining ring 14. The tolerance ring 12 is made of corrugated metal and is provided about the periphery of the ball bearing 10 such that the when the ball bearing 10 and tolerance ring 12 are inserted into the housing, the tolerance ring 12 may deform to take-up tolerances between the periphery of the ball bearing 10 and an annular wall of the housing. Thus, the tolerance ring 12 generally centers the ball bearing 10 in the housing and provides radial support. Finally, a self-locking retaining ring 14 is pressed into the housing to engage the annular wall thereof to prevent the ball bearing 10 from moving out of the housing in a direction opposite the insertion direction.

The above-described ball bearing mounting is effective, but it is costly since there are several components to be manufactured and several assembly steps to be performed. Accordingly, there is a need to provide a one-piece ball bearing mounting member which combines the functions of the conventional tolerance ring and retaining ring and is thus less expensive to manufacture and assemble.

SUMMARY OF THE INVENTION

An object of the invention is to fulfill the need referred to above. In accordance with the principles of the present invention, this objective is achieved by providing a one-piece ball bearing mounting member for mounting a ball bearing in a housing. The mounting member includes a ring member. Tolerance take-up structure extends from the ring member in one direction and is constructed and arranged to engage at least a portion of a periphery of a ball bearing. At least a portion of the tolerance take-up structure is resilient so that when inserted into the housing the resilient portion contacts a wall of the housing to take-up tolerances between the periphery of the ball bearing and the wall of the housing. A retaining structure extends from the ring member in a direction opposite the one direction. The retaining structure is constructed and arranged 1) to permit insertion of the ball bearing mounting member into the housing in an insertion direction, and 2) to substantially prevent movement of the ball bearing mounting member from the housing in a direction opposite the insertion direction.

In accordance with another aspect of the invention, a method of providing a ball bearing mounting member includes stamping a piece of material to form a ring member, a plurality of retainer tabs and a plurality of tolerance take-up tabs. The retainer tabs are bent to extend from the ring member in one direction. The tolerance take-up tabs are bent to extend from the ring member in a direction opposite the one direction. A resilient portion is formed in each tolerance take-up tab. The tolerance take-up tabs are constructed and arranged to engage at least a portion of a periphery of a ball bearing. The resilient portion is constructed and arranged to contact a wall of a bearing housing to take-up tolerances between a periphery of the ball bearing and the wall of the housing. The retainer tabs are constructed and arranged 1) to permit insertion of the ball bearing mounting member into the housing in an insertion direction, and 2) to prevent movement of the ball bearing mounting member from the housing in a direction opposite the insertion direction.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

Figure 1:
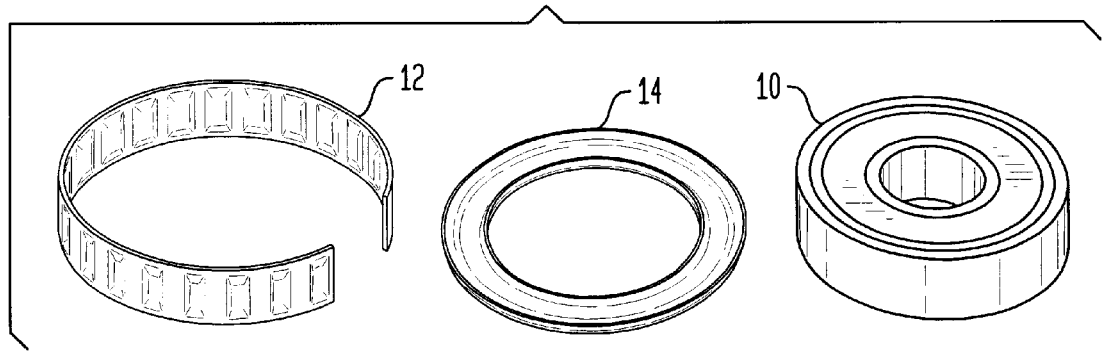
FIG. 1 is a view of conventional components for mounting a ball bearing.
Figure 2:
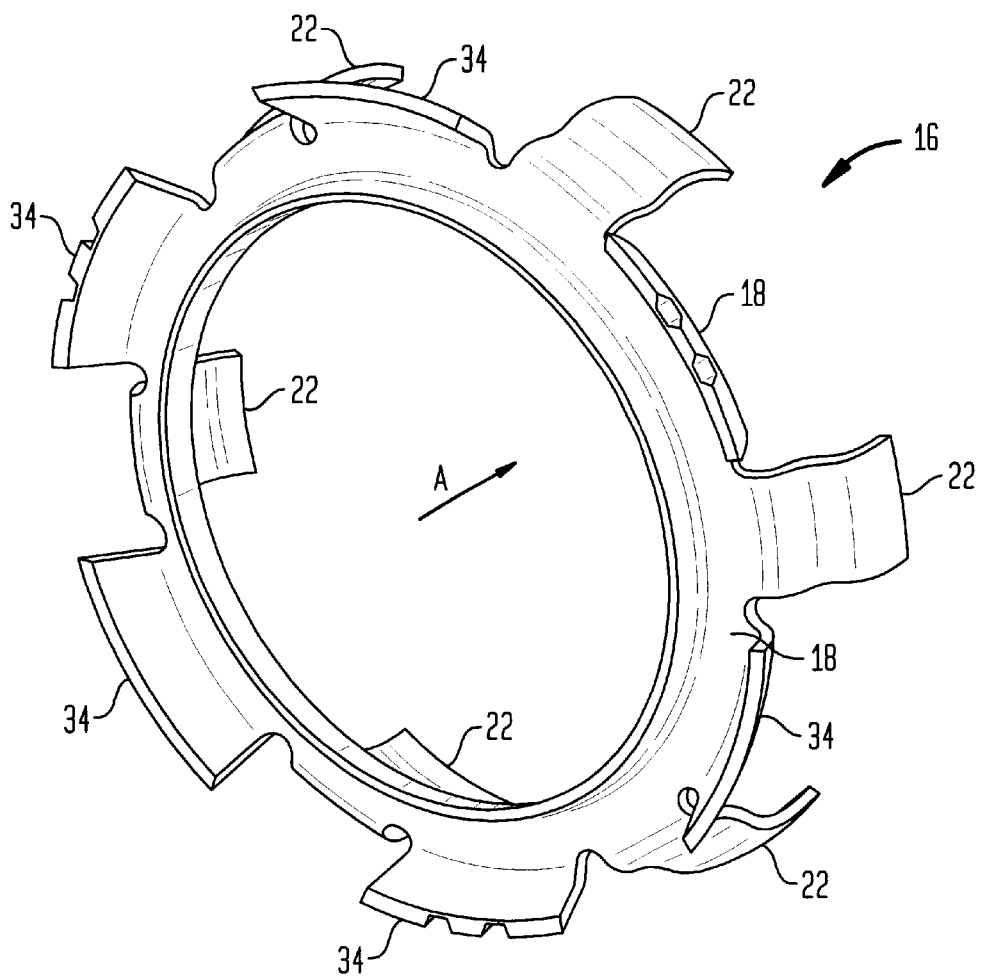
FIG. 2 is a perspective view of a ball bearing mounting member provided in accordance with the principles of the present invention.
Figure 3:
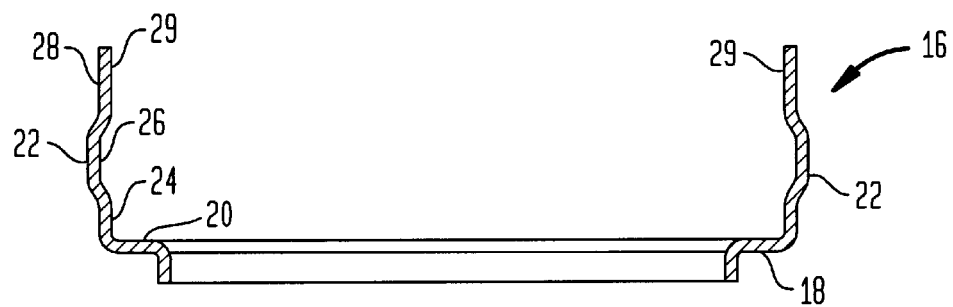
FIG. 3 is a cross-sectional view of the ball bearing mounting member of FIG. 2 taken along a line through the tolerance take-up structure thereof.
Figure 5:
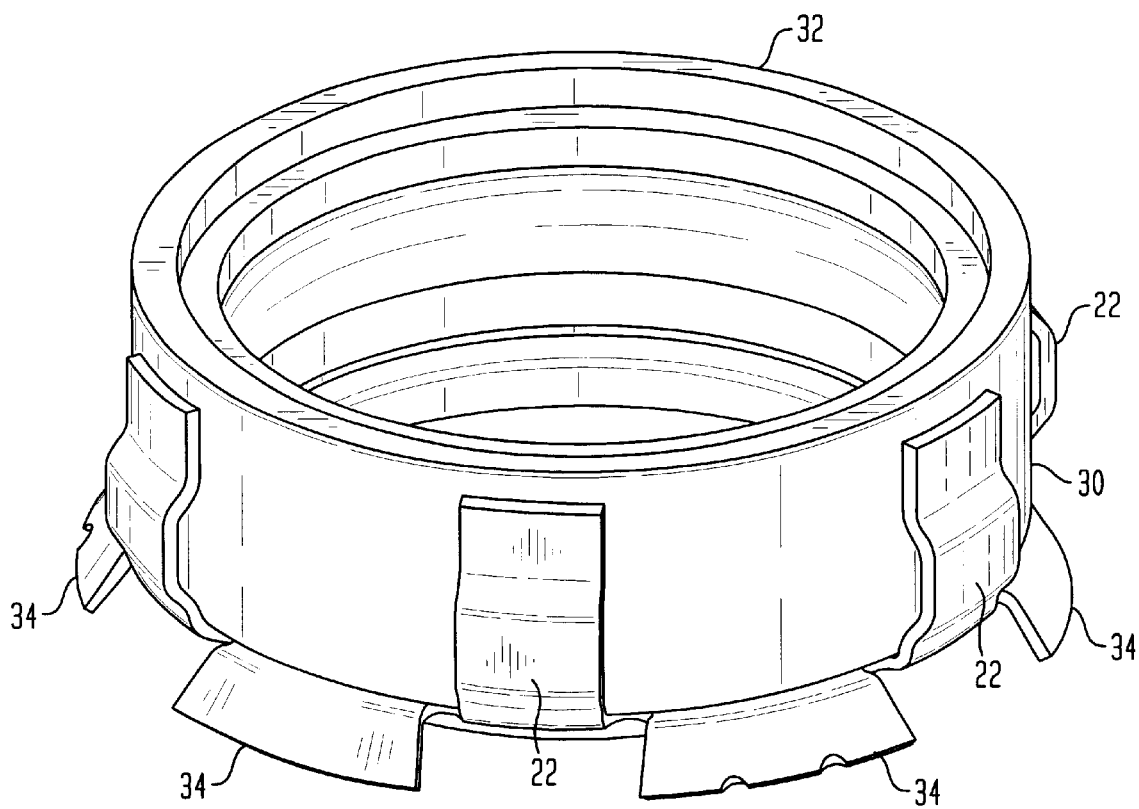
FIG. 5 is a perspective view of the ball bearing mounting member of FIG. 2 shown coupled to a ball bearing.

With reference to FIG. 2, a one-piece ball bearing mounting member, generally indicated at 16, is shown provided in accordance with the principles of the present invention. The mounting member includes a ring member 18 defining a ball bearing engaging surface 20 (FIG. 3). Tolerance take-up structure extends from the ring member 18 in the direction of arrow A in FIG. 2. The tolerance take-up structure is in the form of a plurality of tabs, generally indicated at 22, disposed in spaced relation about the outer periphery of the ring member 18. It can be appreciated that the tabs 22 may be located at the inner periphery of the ring member 18. As best shown in FIG. 3, each tab 22 has a bearing engaging portion 24, an inwardly concave resilient portion 26 and a distal end portion 28. The distal end portion 28 flares inwardly to define a surface 29 which is substantially coplanar with the bearing engaging portion 24. Thus, portions 29 and 24 are constructed and arranged to engage the outer periphery 30 of a cylindrical ball bearing 32 as shown in FIG. 5. When the tabs 22 are engaged with the ball bearing 32 and the ball bearing 32 is inserted into a stamped housing (not shown), the resilient portion 26 of the tabs 22 engage an annular wall of the housing to take-up the space or tolerances between the housing wall and the periphery 30 of the ball bearing 32. Thus, the tabs 22 radially secure the ball bearing 32 in the housing.

Figure 4:
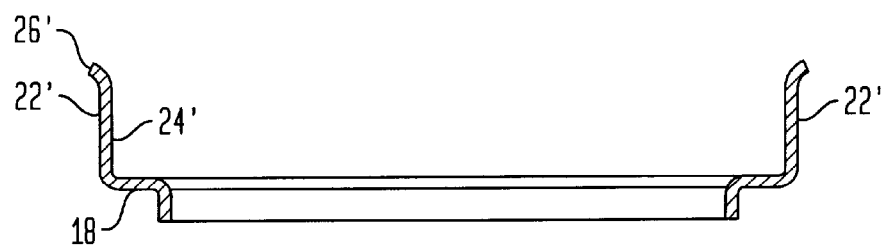
FIG. 4 is a cross-sectional view of another embodiment of the ball bearing mounting member of the invention taken along a line through the tolerance take-up structure thereof.

Another embodiment of the tolerance take-up structure is shown in FIG. 4 and comprises a plurality of tabs 22' spaced about the periphery of the ring member 18. Each tab 22' includes a bearing engaging portion 24' and an outwardly flaring distal tip defining a resilient portion 26'. Thus, when the tabs 22' are engaged with a ball bearing and the ball bearing is inserted into a stamped housing (not shown), the resilient portion 26' engages an annular wall of the housing to take-up the tolerances between the housing wall and the periphery of the ball bearing.

The mounting member 16 also comprises a retaining structure extending from the ring member 18 in a direction opposite the direction of arrow A in FIG. 2. The retaining structure comprises a plurality of retainer tabs 34 disposed in spaced relation about the outer periphery of the ring member 18. Each of the retainer tabs 34 flares outwardly so as to engage the annular wall of the stamped housing when the bearing 32 with mounting member 16 coupled thereto is pressed into the housing. Thus, the retainer tabs 34 are constructed and arranged 1) to permit insertion of mounting member 16 and bearing 32 into the housing in an insertion direction, and 2) to prevent movement of mounting member and thus bearing 32 in the housing in a direction opposite the insertion direction.

The mounting member 16 is preferably stamped from a piece of metal. After being stamped, the tabs 22 or 22' and the retainer tabs 34 are bent and/or formed into the above-described configurations.

It can be appreciated the mounting member 16 of the invention advantageously combines a retainer structure with a tolerance take-up structure thereby reducing the number of parts of the ball bearing mounting assembly and thus reducing cost.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A one-piece ball bearing mounting member for mounting a ball bearing in a housing, the mounting member comprising:
   a ring member,
   tolerance take-up structure extending directly from said ring member in one direction and constructed and arranged to engage at least a portion of a periphery of a ball bearing, at least a portion of said tolerance take-up structure being resilient so that when inserted into the housing the resilient portion contacts a wall of the housing to take-up tolerances between the periphery of the ball bearing and the wall of the housing, and
   retaining structure extending directly from said ring member in a direction opposite said one direction, said retaining structure being constructed and arranged 1) to permit insertion of said ball bearing mounting member into the housing in an insertion direction, and 2) to prevent movement of said ball bearing mounting member from the housing in a direction opposite said insertion direction.

2. The ball bearing mounting member according to claim 1, wherein said ring member, said tolerance take-up structure and said retaining structure are a metal stamping, said take-up structure and said retaining structure being constructed and arranged to be formed from said stamping.

3. The ball bearing mounting member according to claim 1, wherein said tolerance take-up structure comprises a plurality of tabs disposed in spaced relation about said ring member, each of said tabs including said resilient portion.

4. The ball bearing mounting member according to claim 3, wherein said tabs extend from said ring member near an outer periphery of said ring member.

5. The ball bearing mounting member according to claim 3, wherein each of said tabs includes a bearing engaging portion and an outwardly flaring member defining a distal tip of said tabs, said distal tip defining said resilient portion.

6. The ball bearing mounting member according to claim 1, wherein said retaining structure comprises a plurality of retainer tabs disposed in spaced relation about said ring member.

7. The ball bearing mounting member according to claim 6, wherein said retainer tabs extend from an outer periphery of said ring member, each of said retainer tabs flaring outwardly so as to engage the wall of the housing.

8. The ball bearing mounting member according to claim 1, wherein said ring member defines a bearing engaging surface for engaging a surface of a ball bearing.

9. A ball bearing mounting assembly for mounting a ball bearing in a housing, the assembly comprising:
   a ball bearing having a outer periphery and opposing ends, and a one-piece ball bearing mounting member comprising:
   a ring member,
   tolerance take-up structure extending directly from said ring member in one direction and engaging at least a portion of said periphery of a ball bearing, at least a portion of said tolerance take-up structure being resilient so that when inserted into the housing the resilient portion contacts an annular wall of the housing to take-up tolerances between the periphery of the ball bearing and the annular wall, and
   retaining structure extending directly from said ring member in a direction opposite said one direction, said retaining structure being constructed and arranged 1) to permit insertion of said ball bearing mounting member and said bearing attached thereto into the housing in an insertion direction, and 2) to prevent movement of said ball bearing mounting member and said bearing attached thereto from the housing in a direction opposite said insertion direction.

10. The ball bearing mounting assembly according to claim 9, wherein said ring member, said tolerance take-up structure and said retaining structure are a metal stamping, said take-up structure and said retaining structure being constructed and arranged to be formed from said stamping.

11. The ball bearing mounting assembly according to claim 9, wherein said tolerance take-up structure comprises a plurality of tabs disposed in spaced relation about said ring member, each of said tabs defining said resilient portion.

12. The ball bearing mounting assembly according to claim 11, wherein said tabs extend from said ring member at an outer periphery of said ring member.

13. The ball bearing mounting assembly according to claim 11, wherein each of said tabs includes a bearing engaging portion and an outwardly flaring member defining a distal tip of said tabs, said distal tip defining said resilient portion.

14. The ball bearing mounting assembly according to claim 9, wherein said retaining structure comprises a plurality of retainer tabs disposed in spaced relation about said ring member.

15. The ball bearing mounting assembly according to claim 14, wherein said retainer tabs extending from an outer periphery of said ring member, each of said retainer tabs flaring outwardly so as to engage the wall of the housing.

16. A method of providing a ball bearing mounting member including:

stamping a piece of material to form a ring member, a plurality of retainer tabs and a plurality of tolerance take-up tabs, bending said retainer tabs to extend directly from said ring member in one direction, bending said tolerance take-up tabs to extend directly from said ring member in a direction opposite said one direction and forming a resilient portion in each tolerance take-up tab, said tolerance take-up tabs are constructed and arranged to engage at least a portion of a periphery of a ball bearing, and said resilient portion is constructed and arranged to contact a wall of a bearing housing to take-up tolerances between a periphery of the ball bearing and the wall of the housing, and said retainer tabs are constructed and arranged 1) to permit insertion of the ball bearing mounting member into the housing in an insertion direction, and 2) to prevent movement of the ball bearing mounting member from the housing in a direction opposite said insertion direction.

\* \* \* \* \*